United States Patent [19]

Douglass

[11] E Re. 28,749

[45] Reissued Mar. 30, 1976

[54] COIN CONTROLLED MEANS FOR VENDING MACHINES AND THE LIKE

[75] Inventor: James C. Douglass, Crestwood, Mo.

[73] Assignee: H. R. Electronics Company, High Ridge, Mo.

[22] Filed: Apr. 28, 1975

[21] Appl. No.: 572,437

Related U.S. Patent Documents

Reissue of:

[64] Patent No.: 3,754,629
Issued: Aug. 28, 1973
Appl. No.: 204,988
Filed: Dec. 6, 1971

[52] U.S. Cl. ..... 194/1 N; 194/10
[51] Int. Cl.[2] ..... G07F 9/04
[58] Field of Search ..... 194/1 N, 1 J, 1 Q, 1 M, 194/9, 10; 133/4, 8

[56] References Cited

UNITED STATES PATENTS

| | | | |
|---|---|---|---|
| 3,186,531 | 6/1965 | Adams | 194/9 R X |
| 3,478,855 | 11/1969 | Seversen | 194/9 R |
| 3,508,636 | 4/1970 | Shirley | 194/10 |

*Primary Examiner*—Robert B. Reeves
*Assistant Examiner*—Joseph J. Rolla
*Attorney, Agent, or Firm*—Charles B. Haverstock

[57] ABSTRACT

A versatile coin controlled circuit for use in vending and other coin operated machines, said circuit including relatively simple means for establishing a vend price and for simultaneously controlling the amount refunded for each deposit in excess of the vend price. The subject improved control circuit also includes novel logic circuitry operable under control of coin actuated switches, [ novel means ] *a novel accumulator circuit* for accumulating amounts deposited including use of integrated circuits, [ novel means ] *a novel timing circuit* for timing certain circuit and machine operations, and novel circuitry in the input, vending, and change pay-out portions of the circuit. The subject circuit represents a new generation of coin controlled circuits and is simpler and more compact than known circuits used for the same or similar purposes, and it contains far fewer parts and components.

21 Claims, 5 Drawing Figures

INVENTOR:
JAMES C. DOUGLASS
BY Charles B. Haverstock
ATTORNEY.

TRUTH TABLE

| INPUTS | | OUTPUT |
|---|---|---|
| A | B | C |
| 0 | 0 | 1 |
| 0 | 1 | 1 |
| 1 | 0 | 1 |
| 1 | 1 | 0 |

INVENTOR:
JAMES C. DOUGLASS
BY Charles B. Haverstock
ATTORNEY.

COIN CONTROLLED MEANS FOR VENDING MACHINES AND THE LIKE

Matter enclosed in heavy brackets [ ] appears in the original patent but forms no part of this reissue specification; matter printed in italics indicates the additions made by reissue.

Many vending control circuits have been devised and constructed heretofore including vend control circuits capable of providing price selection, refunding of amounts deposited in excess of a selected vend price, and the known circuits have also included various electronic and other types of accumulator means in their vending and refunding portions. There are also known vend control circuits which employ logic circuitry for various purposes. No known control circuit, however, includes gate type logic circuits which prevent the loss of inputs which may occur due to overlapping of the operations of the various of the circuit switches including the coin actuated switches, none have included reset means similar to those included in the present circuit, none consume as little power as the present circuit and none has a simple yet effective means for establishing the vend price. The price selection means in the subject circuit also include means that automatically establish a proper refund in most situations where an amount deposited is in excess of the vend price of the selected article.

As stated, there are numerous known vend control circuits of varying capabilities. However, the present control circuit while performing many functions performed by known control circuits, constitutes a new generation of such circuits which substantially enlarges the operating capability and flexibility of such circuits and includes features including particularly logic circuit features which are different from anything known in the prior art. Several embodiments of the present control circuit are disclosed in this specification.

It is therefore a principal object of the present invention to provide improved and more versatile control circuit means for vending and other coin controlled machines.

Another object is to provide improved price selection means for vending machines and the like.

Another object is to provide relatively simple and inexpensive means for simultaneously establishing a vend price and a proper refund for every deposit which equals or exceeds the established vend price.

Another object is to provide improved logic circuit means under control of impulses produced when coins of various denominations are deposited in a vending machine, said logic circuit means including means to make sure that a proper amount is entered for each coin deposited, prevent false impulses from being produced and entered, initiate a vend and a proper payback operation, and perform other circuit functions.

Another object is to provide a relatively inexpensive yet versatile vend control circuit.

Another object is to substantially reduce the number of circuit components required in the construction of a circuit for controlling the operation of a vending machine and the like.

Another object is to teach the construction and operation of a novel versatile control circuit using integrated circuit elements.

Another object is to reduce maintenance and downtime problems in vending machines.

Another object is to provide means to reset a vend control circuit to a predetermined reset condition whenever the power thereto is restored after an interruption.

Another object is to teach the construction and operation of a coin controlled circuit that can operate to refund nickels and/or dimes.

Another object is to minimize the possibility of a vending machine being out of order for lack of change for refunds.

Another object is to prevent loss of input signals when the operation of several coin switches overlap in time.

These and other objects and advantages of the present circuit will become apparent after considering the following detailed specification which describes several embodiments of the present control circuit in conjunction with the accompanying drawings, wherein.

Figure 1:
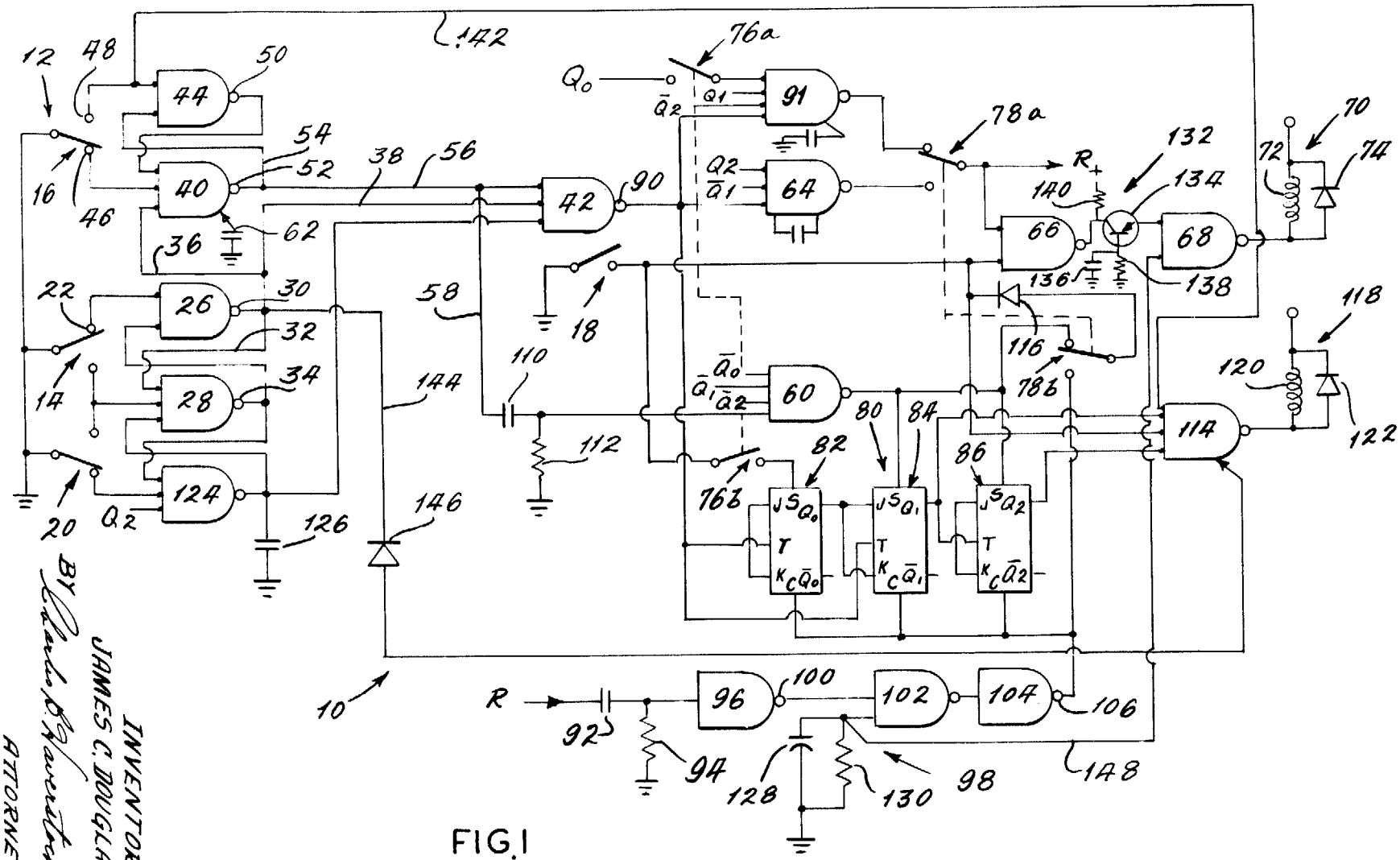
FIG. 1 is a schematic diagram of a control circuit constructed according to one embodiment of the present invention.

Referring to the drawings more particularly by reference numbers, number 10 refers generally to a control circuit constructed according to one embodiment of the present invention. The circuit 10 has an input portion 12 which includes coin actuated nickel, dime and quarter switches 14, 16 and 18, respectively. A cam activated payback switch 20 is also provided and is usually located elsewhere in the vending machine near the payback motor. The coin switches may be of conventional construction and are located in a coin receiving unit which is mounted on the vending machine at some convenient location close to or remote from the subject control circuit. The coin switches 14, 16 and 18 are connected to input terminals of associated logic circuits, and in the circuit as shown in FIG. 1, the coin switches when actuated by a coin operate to ground certain gate circuit input terminals and to remove the ground connections from others, as will be explained. The operation of the logic circuitry associated with the coin switches as well as the other circuits will be described in detail.

The nickel coin switch 14 has a movable switch contact which is in its normally closed position when engaged with a stationary switch contact 22. When activated by a nickel, dime or quarter the movable contact of the nickel switch moves out of engagement with the contact 22 and into engagement with another stationary contact 24. The movable nickel switch contact is connected to ground, the stationary contact 22 is connected to one of two inputs of NAND gate 26, and the stationary contact 24 is connected to one of three inputs of another NAND gate 28. The gate 26 has its output 30 connected to the other input terminal of the gate 28 by a lead 32, and output terminal 34 of the gate 28 is similarly cross-connected to the second input terminal of the gate 26. In other words, the NAND gates 26 and 28 are cross-connected or cross-coupled to each other for reasons which will be explained.

Figures 2, 3:
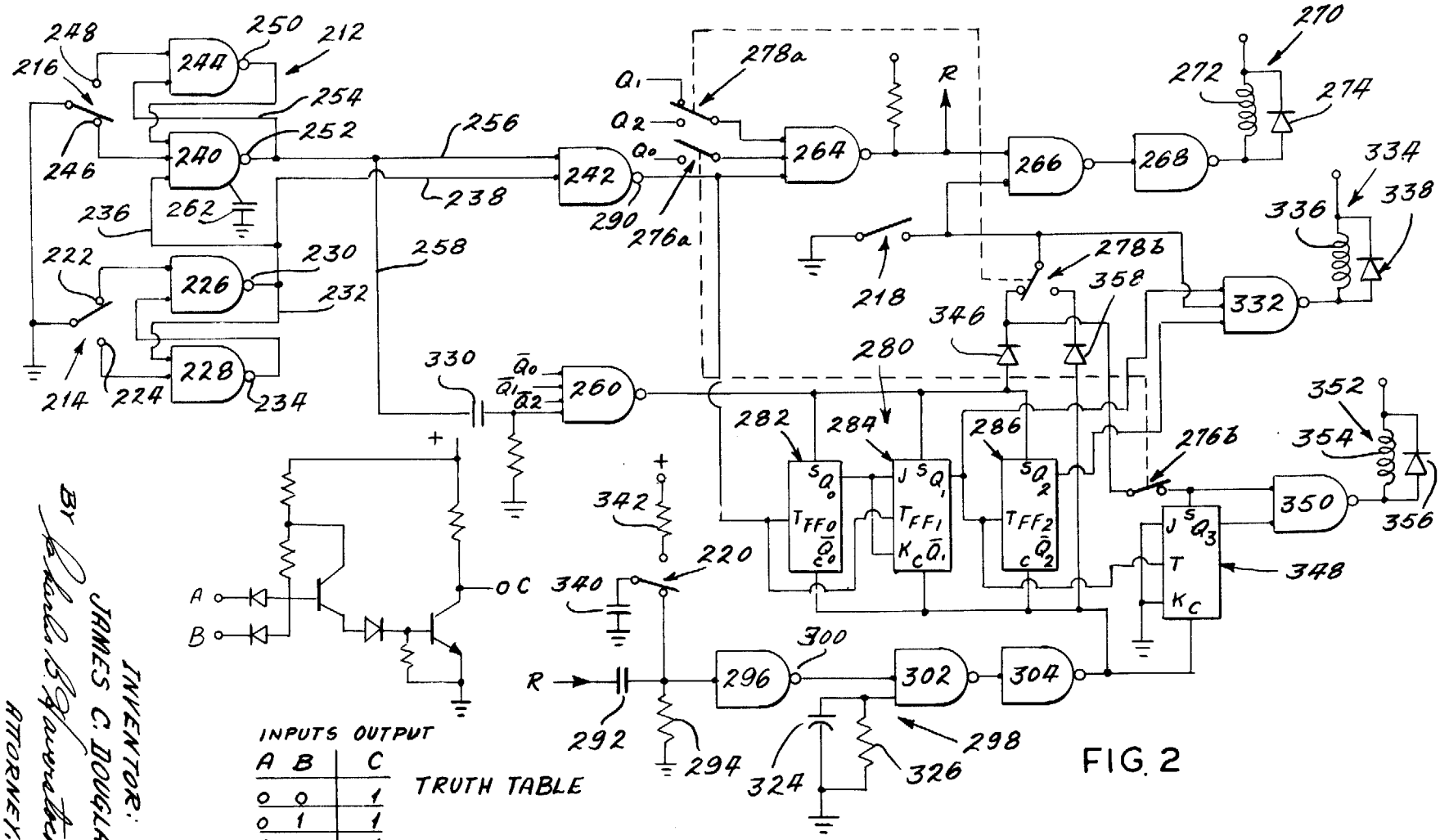
FIG. 2 is a schematic diagram showing a modified embodiment of the present control circuit.
FIG. 3 is a schematic circuit diagram of a typical NAND gate circuit for use in the present control circuits.

The NAND gates 26 and 28, as well as the other NAND gates included in the present circuits, may all be of the same or of a similar construction and all operate substantially the same way. It is assumed that the usual types of binary inputs and outputs to the various gate circuits are used wherein a high voltage input or output signal is considered to be a logical or binary 1, and a low or grounded input or output is a logical or binary 0. A typical truth table for a two input NAND gate will show that when the two inputs are different, that is when one has a logical 0 and the other a logical 1, the gate output will have a logical one. If both inputs are logical zeros, the output will also be a logical one, but if both inputs are logical ones then the output will be a logical 0. This is a standard truth table format for a NAND gate and can be expanded to cover NAND gates having any number of input terminals. Regardless of the number of input terminals, the output will be a logical 0 only when all of the input terminals simultaneously have logical ones except when the output is pulled down by some other external circuit such as a ground. Some of the NAND gates used in the present circuit may have their internal circuitry modified for some reason and when this is done it will be explained, but even in these cases the truth table information will be the same. A typical NAND gate circuit is shown in FIG. 3 and it is not deemed necessary to describe its operation in detail since such circuits are well known in the art.

When the nickel switch 14 is actuated so that its movable contact moves out of engagement with the contact 22 and into engagement with contact 24, contact 22 goes from a logical 0 condition to a logical 1 condition and the contact 24 goes from a logical 1 condition to a logical 0. This means that the output of the gate 26 which originally had a logical 1 before the switch 14 was actuated will not be changed when the switch moves out of contact with the terminal 22. However, as soon as the movable switch contact engages the contact 24, the gate 28 which up to that time had a logical 1 on both inputs and a logical 0 on its output, will be changed so that its output will become a logical 1. This is so because the grounding of the contact 24 in turn causes a logical 1 to be on both of the inputs of the gate 26 and hence changes the output of the gate 26 to a logical 0. Up to this point we have only considered what happens to the gates 26 and 28 when a coin actuates the nickel switch 14.

The output of the gate 26 is also connected by other leads 36 and 38 to input terminals, respectively, of other NAND gates 40 and 42. The NAND gate 40 together with another NAND gate 44 are in the logic circuitry associated with the dime switch 16 and the gates 40 and 44, like the gates 26 and 28 are cross-connected or cross-coupled each having one input which is connected, respectively, to the normally closed and normally open stationary contacts 46 and 48 of the dime switch 16, and the movable contact of the dime switch 16 is grounded. The NAND gate 44 has an output terminal 50 which is connected to the second input of the gate 40, and the output 52 of the gate 40 is connected by lead 54 to the second input of the gate 44. The same output terminal 52 is also connected by other leads 56 and 58, respectively, to a second input of the NAND gate 42 and to one of four inputs of another NAND gate 60. The NAND gate 60 is the nickel payback logic portion of the circuit 10 and will be described later.

The NAND gate 40 in the dime logic circuit is modified somewhat by being provided with an expander connection which is connected to a grounded capacitor 62. The expander connection and the capacitor 62 are provided so that when all of the inputs to the gate 40 become logical ones at the same time, a delay will occur before the output of the gate 40 can change to a logical 0 due to the time required to charge the capacitor 62. This delay feature is a safety provision to make sure that the circuit is in its proper condition following each actuation of the switch 16 before an output is available from the gate 40. The logic circuit associated with the dime switch 16 operates in a manner similar to the logic circuit for the nickel switch 14 except that acuation of the nickel switch 14, which takes place before actuation of the dime switch 16, inhibits the dime logic circuit during the time that the nickel switch is operating. This same logical zero which is produced when the nickel switch is operating is also applied to one of the inputs of the gate 42 in the vend logic circuit. The return of the nickel switch 14 to its inoperative condition is necessary to condition the dime logic circuit by establishing a logical 1 on the input thereof that is connected to the output 30 of the gate 26, and as stated, is not available until the nickel switch returns to its normally closed or inoperative condition.

The vend logic circuitry includes four series connected NAND gates 42, 64, (or 91), 66 and 68 connected as shown. The inputs to the NAND gate 42, as already explained, come from the outputs of the nickel NAND gate 26 and from outputs of the dime NAND gate 40. Before any coins are deposited in the machine the outputs of both of the NAND gates 26 and 40 will be logical ones, and after the nickel and dime switches have been actuated they will both have been changed to logical zeros. When a deposit equals or exceeds the established vend price, the gate circuits 42, 64 (or 91), 66 and 68 will operate to momentarily energize a vend relay circuit 70 which is shown as including a vend relay coil 72 connected in parallel with a diode 74. The vend relay circuit 70 operates contacts at other places in the vending machine which cause a vend cycle to take place. The construction and operation of the means under control of the vend relay which cause a vend operation may be of known construction and are not as such parts of the present control circuit.

The present circuit as shown, can be adjusted to accommodate a 15 cent, a 20 cent and a 25 cent vend price and it will be apparent that with slight modification it can also be made to accommodate other vend prices as well. The price selectivity obtainable with the present circuit is also easy to obtain simply by setting the positions of two two-position switches as will be explained. The price selectivity feature in combination with other features including the manner in which the gate circuits operate, the use of integrated circuits, the means including the cross-coupling of gates which prevent entry of false entries due to noise signals and so forth while assuring proper entries, the unique accumulator reset feature, the anti-jackpot feature, and the novel way refund and reset operations take place, all distinguish the present control means. In connection with the refund means it should be noted that all refunds being made by the circuit of FIG. 1 are made in the lowest denomination coinage acceptable while the embodiment of FIG. 2 makes refunds in either of the two lowest denomination coins depending on the amount of each refund. It is also significant that the subject control circuit embodiments are designed specifically using integrated circuit (ICS) which represents a new generation of vending control circuits. Such circuits are relatively inexpensive, highly reliable, and can be made very compact and of fewer components. For example, practically the entire circuit 10 can be constructed of a very few IC chips, some, if not all of which are available as off-the-shelf items.

When using the 15 cents, 20 cent and 25 cent embodiment shown in FIGS. 1 and 2, the customer can deposit any combination of nickels, dimes or quarters to equal or exceed the established vend price, and regardless of the order of his deposits he will receive a vend and the correct change, if any. It is never possible with the circuits as disclosed, however, to require more than two nickels to be refunded, and in some cases only one nickel will be refunded. For example, for a 15 cent vend price it is possible to deposit one dime and one nickel, three nickels, two dimes, two nickels followed by a dime, or a quarter. For a 20 cent vend price the deposit possibilities are two dimes, two nickels followed by one dime, a nickel followed by two dimes, or a quarter; and for a quarter vend price the possibilities include any combination of nickels and dimes or a quarter, as well as a nickel or dime followed by deposit of a quarter or a deposit of three dimes. The present circuit can accommodate any of these deposit combinations for any of the three possible selected vend prices and cause a vend operation to take place as well as make a proper refund.

The present circuit also includes simple means for changing the vend price to any of the three named prices using in the circuits as disclosed two simple, two position switches 76 and 78 which are preferably simple two position slide switches, each having two sets of transferable contacts. The price selection switch contacts for the switch 76 are labeled in FIG. 1 as contacts 76a and 76b, and for the switch 78 are labeled 78a and 78b. The switches 76 and 78 are shown with their contacts in the positions they are in when set to establish a 15 cent vend price. If the movable contacts 76a and 76b of the switch 76 are transferred from the positions as shown to their alternate positions, the circuit will establish a 20 cent vend price; and if the movable contacts 78a and 78b of the switch 78 are transferred, leaving the movable contacts of the switch 76 as shown, the circuit will establish a 25 cent vend price.

When coins are deposited in the coin unit on the vending machine, they fall on wires which actuate the respective nickel, dime and quarter coin switches 14, 16 and 18 momentarily transferring their movable coin switch contacts. Nickels, dimes and quarters all will actuate the nickel switch 14 during movement through the coin unit, dimes and quarters will also actuate the dime switch 16, but only quarters will actuate the quarter switch 18. Coin units of this general type and having these requirements are well known in the vending machine art.

Whenever the nickel switch 14 is actuated, the NAND gates 26 and 28, which have inputs connected to the normally closed and normally open contacts 22 and 24, respectively, operate together as a set-reset flip-flop and in so doing prevent the possibility that switch bounce might adversely effect the operation and make an erroneous entry. At the same time, the NAND gates 26 and 28 allow a single pulse to be delivered to the accumulator circuit indicated generally by number 80 by way of the NAND gate 42. The cross connection between the output of the gate 26 and the input to the gate 40 described above, also operates to inhibit an output from the dime switch 16 at this time from being entered in the accumulator 80 at least until after the nickel switch 14 has returned to its normal or nonactuated condition which is the condition of the switch 14 as shown. The capacitor 62 as aforesaid, delays changing the condition of the output of the gate 40 for some predetermined time interval such as 10 microseconds after the nickel switch has returned to its normal deactuated condition. The circuit provisions just described prevent false entries due to switch bounce and also prevent false entries in situations when both of the switches 14 and 16 are simultaneously actuated. This assures that proper entries are made in the accumulator 80 from the coin unit 12 and that no inputs are lost.

The accumulator circuit 80 is shown constructed of three similar stages 82, 84 and 86, each including a j–k flip-flop which is part of an integrated circuit (IC). Each stage has a clear (C) input, a transfer (T) input, a set (S) input, a Q output, a $\overline{Q}$ output and j and k inputs. It is to be understood that when the state of a binary flip-flop changes, the conditions of the outputs at its Q and $\overline{Q}$ terminals by definition reverse, that is if the Q terminal is at binary one and $\overline{Q}$ terminal is at binary zero, these conditions will reverse when the flip-flop is actuated. The same is true in the reverse sense. The transfer (T) inputs to the first and second stage flip-flops 82 and 84 are connected to the output terminal 90 of the NAND gate 42, and the clear (C) inputs of all three of the flip-flops are connected to a reset circuit which will be described later.

Entries into the accumulator 80 from the nickel and dime switches 14 and 16 are made through the gate 42 and are made in a binary form. These entries are decoded by the gate 64 and by another companion gate 91 depending on the selected vend price as determined by the setting of the switches 76 and 78.

For a 15 cent vend price with the switches set as shown in FIG. 1, the closed side of the switch contacts 78a selects the gate 91 over the gate 64 for decoding, and the gate 64 has no effect on the operation. Furthermore, with switch contacts 76a open, the $Q_0$ input from flip-flop 82 to the gate 91 is disconnected and the open circuit condition of this input acts as though it were a binary 1. After two counts or 10 cents is accumulated in the accumulator 80, either by the deposit of two nickels, one dime, or by the deposit of a nickel followed by a dime, which has only just cleared the nickel switch 14 but not yet operated the dime switch 16, the $Q_1$ output of the second stage flip-flop 84 will be in a binary 1 condition and the $\overline{Q}_2$ output of the flip-flop 86 will remain at a binary 1 condition. At this time all of the inputs of the gate 91 except the input that is connected to the output of gate 42 will be binary ones. This means that when next the nickel or dime switch 14 or 16 closes, the output of the gate 42 will go from a binary 0 to a binary 1 thereby making all of the inputs to the gate 91 simultaneously binary ones causing the output of the gate 91 to go to a binary 0. This change is applied through the switch contacts 78a and through the NAND gates 66 and 68 to energize the vend relay circuit 70 to initiate a vend operation. The vend relay circuit 70 will remain energized for as long as the last closed nickel or dime switch remains closed and thereafter when the nickel or dime switch returns to its normal deactivated condition, the output of the gate 42 will return to a binary 0 condition, causing the output of the gate 91 to go back to a binary 1. This in turn deenergizes the vend relay circuit 70. Furthermore, when the gate 91 goes from binary 0 to binary 1, the positive transition is coupled through a circuit which includes the lead labeled R in the output of the gate 91 to the input of a reset circuit which includes series connected capacitor 92 and resistor 94. This series circuit is connected to the input of another NAND gate 96 in reset circuit 98 and produces a change at output terminal 100 of the gate 96 which is applied to one of the inputs of another NAND gate 102 in the reset circuit 98. This input produces a change at output terminal of the gate 102 and at an input of another NAND gate 104 which in turn has its output 106 connected to several places in the accumulator circuit including to the clear (C) inputs of the flip-flops 82, 84 and 86. When the binary one output of the gate 91 on the R lead is coupled through the capacitor 92 to the input of the gate 96 it produces a change in the states of the gates 102 and 104 and causes the output of the gate 104 to go to a binary 0 condition which operates to reset the flip-flops 82, 84 and 86. Hence, when the circuit as described is set to vend 15 cent items and the vend price has been deposited, the circuit will operate to energize the vend relay circuit 70 and to clear or reset the accumulator flip-flops 82, 84 and 86. Up to this point the description has only been concerned with producing a vend and an accumulator clear or reset operation. The operation of the refund or payback means, when an amount greater than the vend price is deposited, will be described later.

As stated, it is a simple matter to change the vend price from a 15 cent to 20 cent by changing the setting of the switch 76 and its contacts 76a and 76b so that the switch contacts 76a and 76b are closed. In this case the setting of the switch 78 does not change. Under these changed conditions, the switch contacts 78a still select the gate 91 over the gate 64, and the switch contacts 76a control at least in part when the gate 91 produces an output for decoding. The gate 64 will still have no effect on the operation. With this situation the $Q_0$ output of the first stage flip-flop 82 will be applied as one of the inputs of the gate 91 through the now closed switch contacts 76a. The $Q_1$ output of the flip-flop 84 will also be applied to an input of the gate 91 as will the $\overline{Q_2}$ output of the flip-flop 86. After 15 cents has been deposited and accumulated in the accumulator circuit 80 the $Q_0$ output of the flip-flop 82 will be in a binary 1 condition, the $Q_1$ output of the flip-flop 84 will be in a binary 1 condition, and the $\overline{Q_2}$ output of the flip-flop 86 will also be in a binary 1 condition. Hence, after a 15 cent deposit for a 20 cent vend price, there will be binary ones on all but the lower input to the gate 91 and on the next closure of the nickel or dime switch 14 or 16, a binary 1 will also be present on the lower input of the gate 91 causing the output of the gate 91 to change from a binary 1 to a binary 0. This, in turn, will cause the vend relay control circuit 70 to be energized through the gates 66 and 68 as aforesaid, and will also initiate a reset operation by a signal present on lead R similar to the reset operation described above in connection with a 15 cent vend.

When the present circuit is set to a 25 cent vend price, the switch 76 will be set with its contacts 76a and 76b as a shown in FIG. 1, and the switch 78 will be set in its alternate position with its contacts 78a and 78b moved to their transferred positions from those shown. In this case, the switch contacts 78a will be set to select the outputs of the gate 64 over the outputs of the gate 91, and the gate 91 will have no effect on the operation of the circuit. After 20 cents is deposited and accumulated in the accumulator 80 for a 25 cent vend, the output $Q_2$ of the binary flip-flop 86 will be at a binary 1 condition and the output $Q_1$ of the flip-flop 84 will be at a binary 0 condition thereby causing the output $\overline{Q_1}$ of the same flip-flop to have a binary 1. Under these conditions the gate 64 will be set to produce a vend output the next time a signal is received from the coin unit through the gate 42 to cause the output of the gate 42 to become a binary 1. The operation will be the same as for the vend and reset functions described above in connection with the 15 cent and 20 cent vends.

Whenever the amount accumulated in the accumulator means 80, in nickels and dimes, is one nickel less than the vend price and a dime is inserted into the coin unit 12, it will be required that the circuit operate to return one nickel in change to the customer. With the circuit in the condition just described, that is one nickel away from the vend price, regardless of the vend price, all of the inputs to the gate circuit 91 or 64 depending on the established vend price, except the inputs from the gate circuit 42 will have logical ones on them. Thereafter, when a dime is deposited it will first actuate the nickel switch 14 causing the output of the gate 42 to go from a logical zero to a logical one causing a vend and a reset operation. The vend output signal, as already mentioned, is produced whenever there is a logical zero at the output of the gate 91 or the gate 64. The reset output occurs on lead R when the nickel switch 14 returns to its normal or deactivated position which is the position as shown in FIG. 1. At this time the dime will have left contact with the nickel switch 14 and will be about to make contact with and actuate the dime switch 16. By the time that the dime switch 16 has been actuated, the reset pulse on lead R will have been applied to the clear (C) inputs of the counter flip-flop circuits 82, 84 and 86 to reset them, and all of the $\overline{Q}$ outputs thereof will now be at binary zeros and the $\overline{Q}$ outputs will be at binary ones.

Thereafter, when the dime actuates the dime switch 16, it will cause the output of the gate circuit 40 to go to a binary 0 condition and this makes the output of the gate 42 go to a binary 1. When the dime moves out of contact with the dime switch 16, the output of the gate 40 will return to a binary 1 condition and this couples a positive pulse, or a momentary binary 1 pulse, to the lower input terminal of the gate 60 through a circuit which includes capacitor 110 and grounded biasing resistor 112. For a short time all of the inputs to the gate 60 including the inputs $\overline{Q_0}$, $\overline{Q_1}$, $\overline{Q_2}$ as well as the remaining input will be at binary ones because all of the $\overline{Q}$ outputs of the flip-flop circuits at this time have binary ones due to being in their reset conditions. This causes a logical zero of relatively short duration to occur at the output of gate 60, and thereafter also at the set (S) inputs to the flip-flop circuits 84 and 86. This in turn causes the $Q_1$ and $Q_2$ outputs of the same flip-flops 84 and 86 to go to binary ones. The return of the dime switch 16 to its deenergized condition after the coin has moved by causes the output of the gate 42 to return to its binary 0 condition which causes the first stage counter flip-flop circuit 82 to change state so that its $Q_0$ output goes to a binary 1 condition.

Another NAND gate 114 which is in the payback portion of this circuit has five separate input connections, one of which is connected to the $Q_1$ output of the flip-flop 84, a second to the $Q_2$ output of the flip-flop 86, and the third to several different locations in the circuit including a connection to the quarter coin switch 18, a connection through a diode 116 to the movable contact of the price switch 78b, and a connection to the movable contact of the price selection switch 76b. Whenever there are binary ones on all three inputs to the NAND gate 114, the output of the NAND gate 114 become a binary 0 and energizes the payback motor control circuit 118 which includes relay coin 120 connected in parallel with a diode 122. When the payback motor circuit is energized, it energizes a payback motor (not shown) which operates to return a nickel to the customer. Each time the payback motor operates it also rotates a cam which actuates the payback switch 20 causing its movable contact to move from its normally closed to its normally open position. During operation of the switch 20, gate 124 associated therewith has binary ones on all of its three inputs, the input at $Q_2$ being a 1, as explained, because this is a necessary condition to initiate a payback operation, it being also connected to one of the inputs of the gate 114. This same connection also prevents false accumulations in the accumulator 80 when a payback operation is taking place under control of external means such as an operator's inventory switch (not shown) commonly used to remove excessive accumulations from the coin tubes.

When the payback mechanism completes its cycle, a binary one is again present on the output of the NAND gate 124 which gate is cross-coupled to the nickel switch gate 28 and operates in conjunction therewith to prevent noise and other signal trash produced by the closing of the switch 20 from causing errors. Also by cross-coupling the gate 124 to an existing circuit gate 28 which is then a shared gate in the manner shown saves the expense of providing another gate. The output of the gate 124 is connected to a corresponding input of the gate 42 making all the inputs thereto have binary ones. This produces a binary 0 at its output and at the transfer (T) input of the first stage counter flip-flop circuit 82 and causes all of the flip-flop circuits 82, 84 and 86 to return to their reset or binary 0 states. When this happens, the $Q_1$ and $Q_2$ outputs of the flip-flops 84 and 86 return to their binary 0 states and this deenergizes the payback circuit 118 thereby stopping the payback motor. It is possible to produce a payback cycle for each selectable vend price depending on the setting of the price selection switches 76 and 78 and operation of the quarter coin switch 18. All of these three switches have contacts connected to the same input of the NAND gate 114, as described above. Up to this point the circuit of FIG. 1 has been described only in connection with the deposit of nickels and dimes. Consideration will now be given to the operation when a quarter coin is deposited and where the vend price is established at 15 cents, at 20 cents and finally at 25 cents.

When the switches 76 and 78 are set for a 15 cent vend price as shown in FIG. 1, the deposit of a quarter actuates the nickel, dime and quarter switches 14, 16 and 18 sequentially. The actuations of the nickel and dimes switches 14 and 16 leave the flip-flop circuit 84 in its binary 1 state which means that its $Q_1$ output will be at binary 1. Thereafter, actuation of the quarter switch 18 causes a vend signal to energize the vend control circuit 70 by applying a binary 0 to the lower input of the NAND gate 66 when the quarter switch 18 is closed. This causes the output of the NAND gate 66 to go to a binary 1 and in turn causes the output of the NAND gate 68 to go to a binary 0 to initiate the vend cycle. The vend control circuit will be energized for the duration of the time that the quarter switch 18 remains closed plus an additional time delay that will be described later.

The actuation of the quarter switch 18 also causes a binary 0 to be applied to the set (S) inputs of the flip-flop circuits 84 and 86 through a circuit which includes the price switch contacts 78b, setting both of these flip-flops to binary 1 conditions. When the quarter switch 18 is released by the quarter moving out of engagement with the quarter coin switch 18, all of the inputs to the gate 114 will have binary ones on them and this will operate to energize the payback control circuit 118 which then energizes the payback motor in order to return a nickel to the customer. The delivery of the first nickel change, causes an input to be applied to the first stage flip-flop 82 through a circuit which includes the payback switch 20 and the gates 124 and 42 thereby causing all of the Q outputs of the flip-flop circuits 82, 84 and 86 to have binary ones on them.

All of the inputs to the NAND gates 114 will still be at binary ones at this time, two of them being connected respectively to the $Q_1$ and $Q_2$ outputs of the flip-flops 84 and 86 and the third input being connected to one of the inputs of the quarter switch 18 which is now open. The same circuit is also connected to one input of the gate 66 and to the switch 78b through the diode 116. Since a 15 cent vend price is established, the switch 78b will be in the position shown. Under these conditions there will still be a binary 1 on the third input to the gate 114 and this will cause a second nickel in change to be delivered to the customer. It will also cause another pulse to be applied to the first stage flip-flop 82 thereby setting all of the Q outputs of the three flip-flop circuits to binary zeros and deenergizing the payback control circuit 118 and the payback motor. It can be seen therefore that when a quarter is deposited at a time when the circuit is set to vend at 15 cents, that two nickels will be refunded to the customer and in the process a vend operation will be performed and the counter means will be reset to their initial condition in preparation for the next operation.

When a quarter is deposited and the machine is set to vend at 20 cents, a vend operation should take place together with a single nickel refund operation. For this situation the switch 76, including the switch contacts 76a and 76b, are in their transferred positions from the positions shown in FIG. 1. The quarter deposit again actuates the nickel, dime and quarter switches 14, 16 and 18 in that order as in the case of the 15 cents leaving the flip-flop 82 and the flip-flop 86 in the binary 0 states the flip-flop 84 in its binary 1 state after the quarter has left the dime switch 16. Thereafter, when the quarter actuates the quarter switch 18, a vend signal is delivered as aforesaid and a binary 0 output is fed to the set (S) inputs of the flip-flops 84 and 86 through the contacts of the price switch 78b. A binary 0 signal is also delivered to the set (S) input of the flip-flop circuit 82 through the price switch contacts 76b. All three of the flip-flops 82, 84 and 86 are now set to binary 1 outputs and thereafter when the quarter releases the quarter switch 18 the payback motor circuit 118 will be energized thereby also energizing the payback motor to payback one nickel. As the nickel is paid back the cam operated payback switch 20 will be actuated and will cause a pulse to be delivered to the transfer (T) input of the first stage flip-flop circuit 82 thereby causing all of the flip-flops 82, 84, and 86 to be restored to their binary 0 output conditions thus preventing reenergization of the payback circuit 118 and preventing a section payback operation. Hence it can be seen that when a quarter is deposited in the machine at a time when the machine is set to vend at a 20 cent price, the machine will operate to return one nickel to the customer and will produce the desired vend operation.

When the machine is set to vend at a 25 cent vend price the contacts of the price switch 76 are as shown in FIG. 1 and the contacts 78a and 78b of the switch 78 are in their transferred positions which are opposite from the positions as shown. In this condition, the quarter again actuates the nickel, dime and quarter switches sequentially as in other cases, and actuation of the nickel and dime switches again causes the flip-flop 84 to be set of a binary 1 condition leaving the flip-flops 82 and 86 at binary 0. Thereafter, when the quarter actuates the quarter switch 18, a vend signal is produced but this time a binary 0 is applied to the clear (C) inputs of the flip-flops 82, 84 and 86 through the now transferred contacts 78b of the switch 78. This resets the three flip-flops and no change is paid back.

In the reset circuit which includes the gates 96, 102 and 104, the lower input to gate 102 is shown connected to a parallel circuit which includes capacitor 128 and resistor 130. These elements and the associated gates form the reset circuit for the subject control means. When no power is applied to the subject circuit, the capacitor 128 discharges through the resistor 130 and after power is applied the capacitor 128 begins to charge through the internal circuit of the gate 102. From the time the capacitor 128 begins to charge until it reaches a threshold voltage usually in a range between from about a volt to 2 or 3 volts, it acts like a binary 0 connected to the lower input of the gate 102. This makes the output of the gate 102 and the input of the gate 104 a binary one. The output of the gate 104 then becomes a binary 0 and this is applied to the clear (C) inputs of the flip-flops 82, 84 and 86 to reset them. However, when the capcitor 128 charges up to a voltage greater than about 2 ½ or 3 volts, the associated input to the gate 102 becomes a binary 1 and remains so until power is again removed from the circuit at which time it discharges through the parallel connected resistor 130. This feature is important to the present circuit because it automatically resets all of the flip-flops each time the power is restored to the circuit after it has been disconnected or interrupted. This prevents the circuit from retaining a count in the counter means 80 when the plug is pulled out or the power otherwise interrupted.

Another improvement feature of the subject circuit is in the transistorized coupling means 132 connected between the output of the gate 66 and the input to the gate 68. These coupling means include a transistor 134 which has its collector electrode connected to the output of the gate 66, its emitter electrode connected to the input to the gate 68 and its base electrode grounded through a circuit formed by parallel connected capacitor and resistor 138. The collector electrode is also connected to a positive voltage source through a biasing resistor 140. The coupling means 132 are included as a precaution against short duration coin switch operation by providing some additional time for energizing the vend control circuit 70 in addition to the time provided by the closure of a coin switch. In the static condition, the input on the gate 68 is held at a relatively low voltage condition (binary zero) through the transistor 134 because of the low voltage on the base electrode thereof. However, when the output of the gate 66 goes high it causes the capacitor 136 to charge relatively rapidly through a circuit which includes the resistor 140. This in turn causes the input to the gate 68 to go high because the collector is no longer grounded as long as the coin switch is closed. Thereafter, when the coin switch reopens the output of the gate 66 will return to a low or binary 0 condition but this cannot cause the input of the gate 68 to simultaneously become low because of the charge on the capacitor 136 which temporarily maintains a relatively high voltage on the base electrode of the transistor 134. This condition is maintained until the charge is dissipated through the resistor 138. This circuit means 132 therefore extends the energizing time of the vend circuit for some short period after the coin switch has lost control such as for 50 milliseconds or so.

Another improvement to the subject circuit is provided by lead 142 (FIG. 1) which is connected between the normally open input connection to the gate circuit 44 in the dime coin circuit and one of the inputs to the NAND gate circuit 114 which is in the circuit that controls the energizing of the refund or payback circuit 118. This connection prevents the payback motor from being energized in the event that either the dime or quarter switch should remain closed or should short out. This is an anti-jackpot feature and as such operates to maintain a binary zero on the associated input of the gate 114.

Another anti-jackpot feature is provided by connection 144 and diode 146 which are connected between the output of the nickel NAND gate 26 and another input, shown as an expander input, to the gate 114. This circuit operates the same as the above described circuit but to prevent jack-potting should the nickel switch 14 remain closed or short out.

Another circuit connection 148 is provided between the input to the reset gate 102 and the input to the vend control circuit gate 68. This connection causes the reset circuit to override any false vend impulses that might be caused by momentary power interruptions or transient circuit conditions due to line jiggle and other like conditions. This connection operates by holding the associated gate 68 input at a low condition until the capacitor 128 recharges to a relatively high static condition.

Figure 1A:
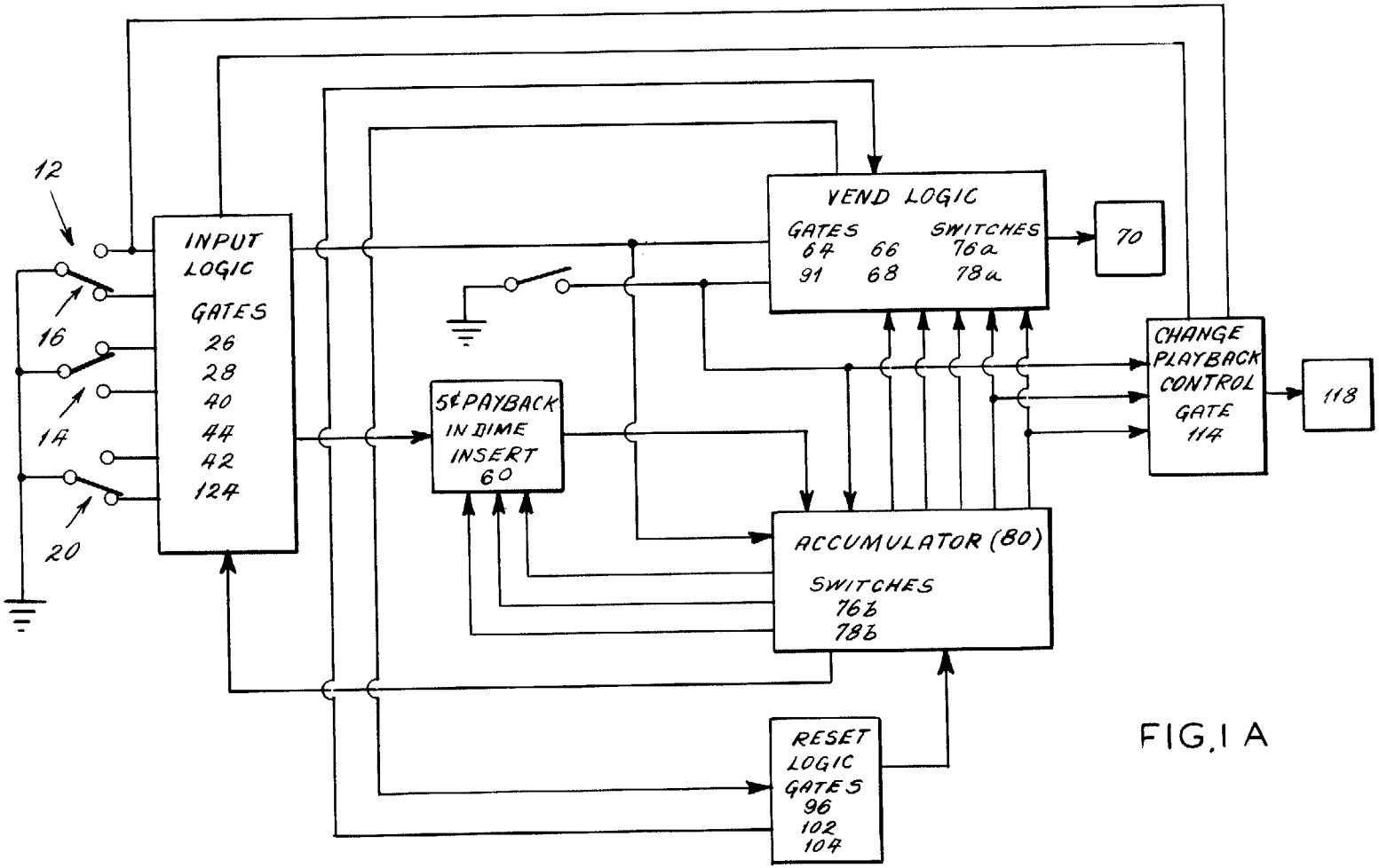
FIG. 1A is a block diagram of the circuit of FIG. 1.

FIG. 1A is a block diagram of the circuit of FIG. 1 with the blocks named and numbered to correspond to the corresponding components in FIG. 1.

FIG. 2 shows another embodiment of the subject control circuit which is similar to the circuit of FIG. 1, but modified in certain respects particularly to enable it to refund both nickels and dimes rather than being limited to only refunding nickels as is the case in the circuit of FIG. 1. There are also other distinguishing features of the circuit of FIG. 2 and these will be pointed out in the description which follows. Insofar as possible, components in the circuit of FIG. 2 will have parts numbers similar to corresponding parts numbers in FIG. 1 but increased in each case by "200." For example, the circuit of FIG. 2 includes a coin unit and associated circuitry 212 which includes a nickel switch 214, a dime switch 216, a quarter switch 218 and a payback switch 220 which is operated by a payback motor (not shown). The nickel switch 214 has a movable contact which is actuated each time a nickel, dime or quarter is deposited as in FIG. 1, and its movable contact moves between a normally closed terminal 222 and a normally open terminal 224.

Before describing the rest of the circuit of FIG. 2 it should be noted that it is particularly constructed to vend at 15, 20 and 25 cent vend prices and will produce a vend operation whenever an amount deposited equals or exceeds the vend price. The circuit will also refund a dime change whenever it is set to vend at 15 cents and a quarter is deposited, and it will return one nickel whenever two dimes are deposited for a 15 cent vend. It will also return one nickel when a quarter is deposited and the machine is set to a 20 cent vend price or when a nickel is deposited followed by two dime deposits. Also, a nickel will be refunded whenever three dimes are deposited for a 25 cent vend price. As will be explained, separate means are provided in the circuit of FIG. 2 for refunding dimes and nickels. It is also anticipated that the dual coin refund capabililty of the circuit of FIG. 2 may prevent the machine from going out of service in some cases. Also, the circuit of FIG. 2 is designed so that the vend price can be changed by the operator or repair or maintenance person simply by having him change the setting of two simple two-position switches, preferably slide switches, located inside of the vending machine on or adjacent to the subject control circuit in a manner similar to the circuit of FIG. 1. The slide switches are shown in the drawing in the positions they would be in for establishing a 15 cent vend price, and the same combination of switch positions as in FIG. 1 can be used to change to the different vend prices. In the circuit of FIG. 2 the refund switch 220 is also actuated by cam means driven off of the payout motor so that when either a nickel or a dime is refunded as the case may be, the payback switch will be cam actuated to reset the circuit in a manner similar to that described in connection with FIG. 1.

Referring again to FIG. 2 the normally closed nickel switch contact 222 is connected to one of the inputs of a NAND gate 226, and the normally open contact 224 is connected to an input of another NAND gate 228. The NAND gates 226 and 228 are cross-connected to form a set-reset flip-flop circuit which, as in the circuit above, prevents a bouncing nickel switch from making false entries into the accumulator circuit. The gate circuits 244 and 240 perform the same function for the dime switch 216 which has its normally closed contact 246 connected as one input to the gate 240 and its normally open contact 248 connected as an input to the gate circuit 244. The gates 240 and 244 are cross-coupled as aforesaid and have output terminals 252 and 250, respectively, and the output 252 of the gate 240 is connected by lead 254 to one of the inputs of the gate 244. The output 230 of the gate 226 is also connected to one of the inputs of the gate 240 by lead 236 and this connection in combination with capacitor 262 assures that unique pulses will be fed to and reach the accumulator circuit through a gate 242 even under circumstances where the closing or actuation of the nickel and dime switches 214 and 216 may overlap. If the operation of the nickel and dime switches overlap by some amount, each pulse produced by their separate closures will produce its own separate output pulse from the gate 242 due to the action of the capacitor 262 which operates to separate the outputs of the gate 242 so that neither pulse is lost. This is an important advantage and one which has not been used heretofore in any known construction.

The signals produced by the actuations of the nickel and dime switches are registered and accumulated in the accumulator circuit 280 in a normal binary fashion, and the outputs of the accumulator 280 are decoded through the switch contacts 276a and 278a which are connected in the input circuits to the gate 264. When the accumulated value of nickels and dimes is 5 cents less than the established vend price as controlled by the setting of the switches 276 and 278, the upper two inputs to the gate 264 will be at logical ones and therefore receipt of the next impulse caused by the actuation of the nickel or dime switch will cause the output of the gate 242 to become a logical one, and the output of the gate 264 to be changed to a binary 0 and remain so for as long as the last actuated coin switch remains in its actuated condition. The signal thus produced then passes through the gates 266 and 268 to energize the vend control circuit 270 which includes the relay coil 272 and the diode 274 connected thereacross. This in turn energizes the vend circuit which is in the vending machine and produces a vend operation.

The binary 0 output of the gate 264 is also coupled to the reset circuit through the lead labeled "R" which is connected to one side of capacitor 292 in the input of another gate circuit 296 in the reset circuit. This in turns feeds other gates 302 and 304, the output of the latter of which is applied to reset all of the accumulator flip-flop circuits 282, 284 and 286. This is accomplished through the connection between the output of the gate 304 and the respective clear (C) inputs to the flip-flop circuits. If the amount deposited had exactly equaled the vend price as established by the setting of the switches 276 and 278, no refund would be required and the circuit for causing a vend and being reset would be restored to a condition ready for the next vend cycle.

If the last coin deposited is a dime coin and it is only necessary to deposit 5 cents to reach the vend price, then a nickel refund operation is required. This condition can occur when two dimes are deposited for a 15 cent vend and when three dimes are deposited for a 25 cent vend. Other combinations such as two nickels followed by a dime for a 15 cent vend or four nickels followed by a dime for a 25 cent vend and so on are also possible. In the case where two dimes are deposited for a 15 cent vend, after the first has passed through the coin unit, two inputs to the gate 264 operating through the switch contacts 276a and 278a will have logical ones on them. When the second dime closes the nickel switch 214, the other input to the gate 264 from the gate 242 also has a logical one and this causes the output of the gate 264 to go to a binary 0 condition, the condition necessary for energizing the vend control circuit 270 to cause a vend cycle to take place. When the second dime moves out of engagement with the nickel switch 214 the output of the gate 264 will return to a high or logical one condition and this will operate to reset the accumulator 280 through the reset circuit already described which includes the capacitor 292 and the gate circuits 296, 302 and 304. At this time, the $Q_0$, $Q_1$ and $Q_2$ outputs of the counter flip-flops are at logical zeros and the complementary flip-flop outputs $\overline{Q}_0$, $\overline{Q}_1$ and $\overline{Q}_2$ are at logical ones.

Immediately thereafter, the dime will actuate the dime switch 216 thereby causing the input side of a capacitor 330 to go to a binary 0. When the dime thereafter moves out of engagement with the dime switch 216 the positive charge on the capacitor 330 is applied to one of the inputs of the gate 260 in the nickel payback logic circuit. With the $\overline{Q_0}$, $\overline{Q_1}$ and $\overline{Q_2}$ outputs of the flip-flop circuits all at binary ones and connected to the respective inputs to the gate 260, the output of the gate 260 will be at binary 0 for the duration of the pulse from the capacitor 330, and this will set all of the flip-flops of the accumulator 280 to binary ones at their Q outputs. This condition is decoded by another gate 332 which has its output connected to energize a first or nickel payback control circuit 334 which includes refund coil 336 and diode 338 connected in parallel. When the circuit 334 is energized it energizes a nickel payback motor (not shown) which in turn actuates the cam operated payback switch 220. As soon as the payback switch 220 is actuated it establishes a circuit for charging another capacitor 340 which is then connected to a positive source through a biasing resistor 342. After the payback motor has refunded a nickel, the payback switch 220 returns to its deactivated position which is the position shown in FIG. 2, and the capacitor 340 then discharges through a circuit which includes another resistor 294. In so doing, it supplies a positive pulse to the input of the gate 296 which then produces an output which operates through the gates 302 and 304 to reset the several stages of the accumulator circuit 280. Up to this point consideration has only been given to those situations where nickels, dimes or combinations thereof are deposited in the vending machine. Under these situations it is never necessary to refund more than one nickel in order to reach an established vend price.

When a quarter is inserted for a 15 cent vend, the nickel and dime switches are operated in sequence and the outputs produced are registered in the accumulator circuit 280 in the usual manner. This is not necessary for the deposit of a quarter, however, because as soon as the quarter actuates the quarter switch 218 the lower input terminal to the gate circuit 266 (FIG. 2) is grounded and goes to a binary 0 thereby also enabling the gate 268 to energize the vend control circuit 270 and cause a vend cycle to take place. In other words, the deposit of a quarter more directly initiates a vend through operation of the gates 266 and 268 than for the situations described above. With the vend price selection switches 276 and 278 in the positions shown in FIG. 2 which are their positions to establish a 15 cent vend price, the closing of the quarter switch 218 applies a binary 0 condition through the price switch contacts 278b and diode 346 to all of the set (S) inputs of the accumulator flip-flop. This causes the $Q_0$, $Q_1$ and $Q_2$ outputs to become binary ones, two of which are then applied to associated inputs to the gate 332 which is in the circuit to energize the nickel payback motor control circuit 334. The same signal is also applied through the switch contacts 278b and 276b to the set input terminal of another flip-flop circuit 348 causing it to have a binary one on its $Q_3$ output. Thereafter, when the quarter switch 218 is released by the quarter and returns to its deactivated condition, both of the inputs of another gate 350 will have binary ones on them and this will cause the gate 350 to energize another payback circuit 352 which is the dime payback circuit and includes coil 354 and parallel connected diode 356. The closing by actuation of the quarter switch 218 also places a binary 0 on the middle input (FIG. 2) to the gate 332 and this has the effect of preventing the nickel payback circuit 334 from being energized until after the quarter switch 218 has been released and its contacts reopened. When this happens the circuits 334 and 352 will be energized simultaneously and thereafter released. The situation in which both the circuits 334 and 352 are simultaneously energized causes a dime to be paid back instead of a nickel, and this is under control of mechanical parts of the coin changer mechanism which are not part of the present invention but which can be energized only by the simultaneous energizing of the circuits 334 and 352. During the dime payback operation the payback switch 220 is actuated by a cam under control of the payback motor, as before, and this again causes the charge which is established on the capacitor 340 to be discharged through the resistor 294 in order to reset the flip-flops 282, 284 and 286. The same signal also resets the flip-flop 348 to thereby deenergize the payback mechanism.

When the price switches 276 and 278 are set to establish a 20 cent vend price, the switch contacts 276a and 276b are moved to their alternate or transferred positions from those shown in FIG. 2 and the switch contacts 278a and 278b remain as shown. Under these circumstances operation of the quarter coin switch 218 causes a vend to take place as in the above case, and in the process sets all of the stages of the accumulator circuit 280 to binary ones. This takes place through a circuit which includes the switch contacts 278b and the diode 346 in the manner already described. The binary ones on the output $Q_1$ and $Q_2$ terminals of the flip-flops 284 and 286 are applied to the gate 332 and also as before the other input terminal to the gate 332 is under control of the quarter switch 218. Therefore, when the quarter switch 218 is released as the quarter moves past, the payback circuit 334 is energized and energizes the payback motor. However, with the price switch contacts 276b now open instead of closed in view of the established 20 cent vend price, the $Q_3$ output of the flip-flop circuit 348 can no longer go to a binary one condition to energize the circuit 352 and only a nickel payout operation can take place. This is because, as stated above, both of the circuits 334 and 352 must be simultaneously energized to produce a dime payout, and under the situation just described only the circuit 334 is energized and not the circuit 352.

When the machine is set to vend at a 25 cent price, the switch contacts 278a and 278b are transferred from the conditions shown in FIG. 2 and the contacts 276a and 276b are as shown. For this condition, the vend takes place as before but now when the quarter switch 218 is in its transferred or actuated condition the pulse produced passes through the normally open side of the switch contacts 278b and through a diode 358 to the clear (C) inputs of the flip-flop circuits 282, 284, 286 and 348 to reset them. Inasmuch as no change is required for the deposit of a quarter when the vend price is 25 cents, after the vend operation is completed and the reset takes place, the circuit is in condition for another operating cycle.

The only portion of the circuit of FIG. 2 that has not been described is the second input circuit to the gate 302 in the reset circuit 298. This circuit includes a capacitor 324 and a resistor 326 and is provided to form an initial reset circuit which causes all of the flip-flop circuits to go to an initial reset condition when power is applied as is also true of the similar parts of the circuit of FIG. 1. Further explanation of this feature is not required.

It is also contemplated in the construction of FIG. 2 to include anti-jackpotting features similar to those included and described in connection with FIG. 1 and also to include a transistorized coupling circuit between the gates 266 and 268 in the vend control circuits to extend the time duration that the vend control circuit 270 is energized. Noise immunity can also be achieved by adding capacitors at various locations similar to those included in FIG. 1 and in some cases also to prevent premature reset.

Figure 2A:
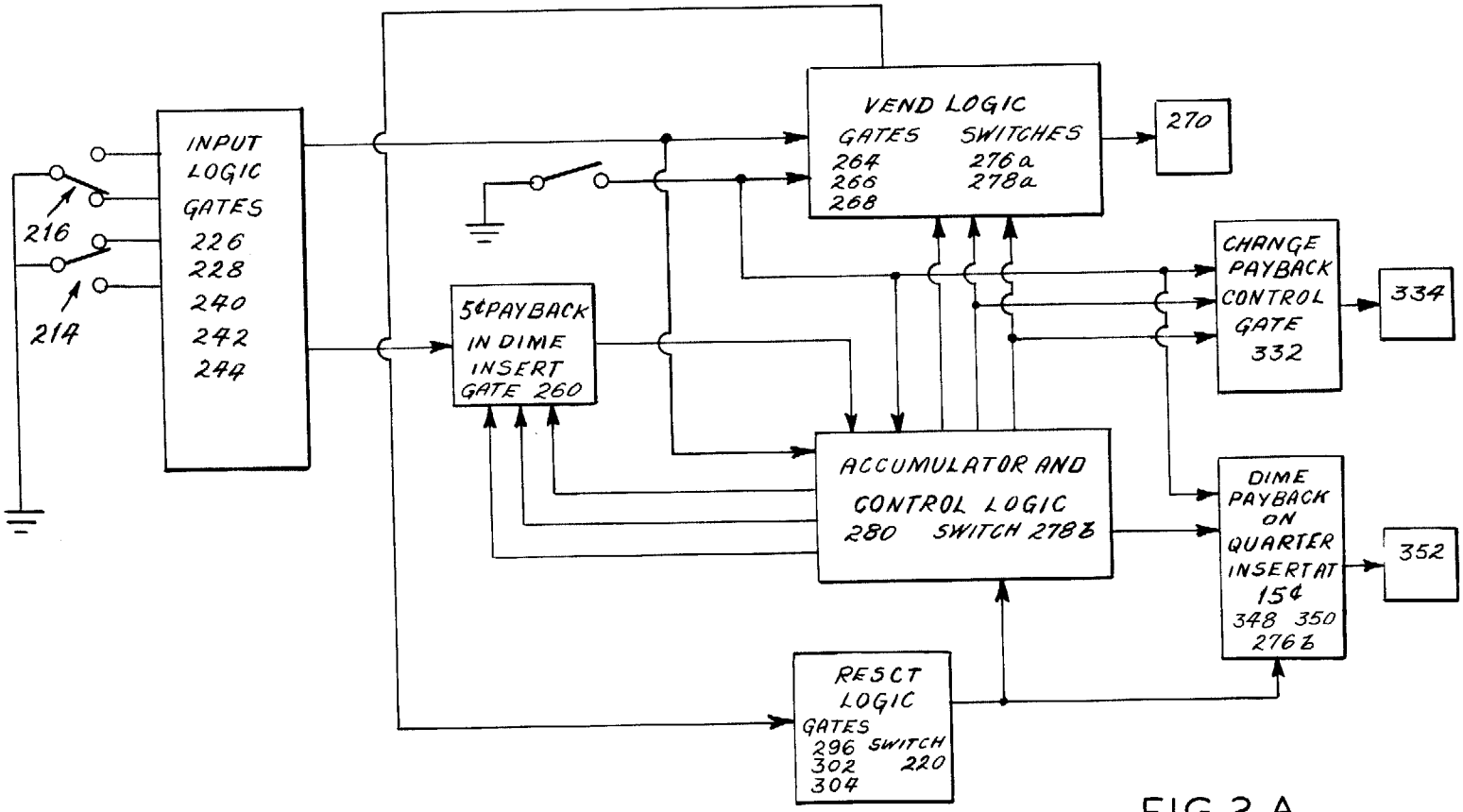
FIG. 2A is a block diagram of the circuit of FIG. 2.

FIG. 2A is a block diagram of the circuit of FIG. 2 with the blocks named and numbered to correspond to the corresponding components of FIG. 2.

FIG. 3 shows a NAND gate of the type used in much of the circuitry of FIGS. 1 and 2. The NAND gate of FIG. 3 may be of a more or less well known construction and operates in a manner typical of such circuits and it is not deemed necessary to describe the NAND gate circuit and its operation in detail except to note that it may have one but it usually has more than one input terminal such as the terminals A and B and an output terminal C. Included in FIG. 3 is a typical truth table for a NAND gate wherein the symbol 0 represents a binary 0 condition and the symbol 1 represents a binary 1. While the NAND gate shown in FIG. 3 is a typical NAND gate various modifications of this circuit are possible and can be used, and it is contemplated to use certain of the modifications for some of the NAND gates. For example, buffer NAND gates which are similar to the gate of FIG. 3 but modified to be used to drive a large number of other gates or a capacitor circuit are contemplated for some of the gates, and power NAND gates which are modified to be able to handle greater output current variations can also be used. Well known expander gate input connections for some of the NAND gates can also be incorporated in certain of the gates including particularly the gates which accommodate the attachment of additional input diodes. The additional inputs to expander gates are usually made externally and increase the number of available inputs.

The accumulator flip-flop stages employed in the present circuits can also be of known construction preferably being constructed using integrated circuit chips. For example, the flip-flops can be gated j–k flip-flop circuits of a commercially available construction and it is not deemed necessary to describe them or their operation in detail for a full understanding of the present invention.

Thus there has been shown and described several embodiments of a novel control circuit for use on vending machines and the like which circuits fulfill all of the objects and advantages sought therefor. Many changes, modifications, variations and other uses and applications of the present circuit will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. In a control circuit for a vending machine having a coin unit capable of accepting coins of more than one denomination and including a plurality of coin switches one of which is actuatable by all acceptable coins, a second of which is actuatable only by coins greater in value than the lowest acceptable denomination, the improvements comprising means to prevent false entries due to faulty coin switch operation including a first pair of NAND gates each having an input operatively connected to the first coin switch, means cross-connecting another input of each of the gates of said first pair to the output of the other gate of said first pair of NAND gates, a second pair of NAND gates each having an input operatively connected to the second coin switch, means cross-connecting a selected one of the inputs of each of the NAND gates of the second pair of NAND gates to the output of the other gates of said second pair, and means connecting the output of one of the gates of said [second] *first* pair to one of the inputs of said [first] *second* pair whereby outputs of said [second] *first* pair are applied to the input of said [first] *second* pair.

2. A coin controlled circuit for use on vending machines and like devices which have coin units capable of accepting coins of at least two different denominations and including first and second coin actuated switches one of which is actuatable by the deposit of each coin of the lowest acceptable denomination, both said first and said second coin actuated switches being actuated in sequence by the deposit of coins of higher value, said circuit comprising a first pair of gate circuits associated with the first coin switch each of which includes at least two inputs and an output connection means cross-connecting selected input connections of each of said first pair of gate circuits to the outputs of the other of said pair, a second pair of gate circuits associated with the second coin switch, each of the gate circuits of said second pair having at least two inputs and an output connection, means cross-connecting a selected one of the inputs of each of said second pair of gate circuits to the output of the other of said pair, means connecting an output of one of said pair of gate circuits to an input of the other of said pairs, a pair of two position price selection switches the combined settings of which establish a desired one of three possible vend prices, accumulator means operatively connected to selected outputs of the first and second pairs of gates to respond to changes in the conditions thereof when coins are deposited to accumulate an amount to represent the value of coins deposited in the coin unit during each vend operation, other means operatively connecting said two position price selection switches to the selected outputs of said first and second pairs of gates and to the accumulator means, means energizeable to initiate a vend operation whenever the amount accumulated in the accumulator means at least equals the established vend price, and means for resetting the accumulator means simultaneously with the initiation of a vend operation.

3. The coin controlled circuit defined in claim 2 including means energizeable to refund amounts deposited in excess of the vend price, said refund means including a refund gate circuit having a plurality of input connections at least one of which includes an operative connection to the accumulator means, another of which includes an operative connection to one of the output connections of said first and second pairs of gates, said refund means including means to refund coins of the lowest acceptable denomination.

4. The coin controlled circuit defined in claim 2 including means energizeable to refund amounts deposited in excess of the vend price, said refund means including first and second refund gates circuits each having a plurality of input connections and an output connection, at least one of the input connections to the first refund gate circuit having an operative connection to the accumulator means and at least one other input connection thereto being operatively connected to the output of one of said first and second pairs of gates, a refund accumulator having a first input connection to the accumulator means, a second input connection to one of the outputs of the first and second pair of gates, and an output connection operatively connected to an input connection to said second refund gate circuit, energizing of the first refund circuit only causing refund of a coin of the lowest acceptable denomination, and simultaneous energizing of the first and second refund gate circuits causing refund of a higher value coin.

5. Improvements in means for controlling the operations of a vending machine that includes a coin unit capable of accepting coins of more than one different denomination and producing output responses to represent the value of each coin deposited, accumulator means for totaling up the value of coins deposited in the coin unit during each vend operation, vend producting means causing a vend to take place whenever an amount accumulated in the accumulator means at least equals an established vend price, and a payback control energizeable to refund coins equal to any amount deposited in excess of the established vend price, the improvements comprising gate circuit means coupled between the coin unit and the accumulator means, said gate circuit means including at least two cross-coupled NAND gates each having at least one input connected to receive responses produced when coins of a selected denomination are deposited in the coin unit and an output operatively connected to the accumulator means, a third NAND gate operatively connected to control the energizing of the vend producing means, said third NAND gate having a plurality of input connections and an output connection, means operatively connecting selected locations in the accumulator means to selected inputs of said third NAND gate, means for applying outputs from said cross-coupled NAND gates produced when coins are deposited in the coin unit to at least one of the inputs to the third NAND gate, an output being produced on the output connection of said third NAND gate to initiate a vend operation whenever all of the inputs thereto are simultaneously in a predetermined condition.

6. The improvements defined in claim 5 wherein the accumulator means include a plurality of serially connected bi-stable j–k flip-flops, each capable of being in a set or a reset condition.

7. The improvements defined in claim 5 wherein the payback control includes a payback NAND gate having a plurality of input connections and an output connection, means connecting one of the input connections to the payback NAND gate to means in the accumulator means, means connecting another one of said connections to a preselected location in the coin unit, an output signal for initiating a payback operation being present on the output whenever all of the input connections are simultaneously at a predetermined condition.

8. The improvements defined in claim 5 including means to prolong the duration of the output from the third NAND gate.

9. The improvements defined in claim 5 including accumulator reset means, said reset means having an input operatively connected to respond to the outputs from the third NAND gate and an output connected to the accumulator means.

10. The improvements defined in claim 9 wherein said reset means includes other means to reset the accumulator means whenever power is initially applied to the vending machine and to the improvements thereto.

11. The improvements defined in claim 5 including means for establishing a vend price including a price selection switch having at least one contact connected in the circuit to one of the plurality of the input connections to said third NAND gate.

12. The improvements defined in claim 11 wherein said third NAND gate is connected in parallel with a fourth NAND gate, said price selection switch having contacts which operate to select between operation of the third and the fourth NAND gates.

13. The improvement in claim 11 wherein the payback control includes means for selecting between the refund of coins of different denominations including first and second payback NAND gates and respective first and second payback means in the vending machine under control thereof, said first payback NAND gate having a plurality of input connections at least one of which is connected to a preselected location in the accumulator means and at least one of which is operatively connected to a preselected location in the coin unit, said second payback NAND gate having a plurality of input connections at least one of which has an operative connection to the same preselected location in the coin unit as the first payback NAND gate, said one input connection being under control of the setting of the price selection switch, and second bi-stable accumulator means having an input operatively connected to the coin unit under control of the setting of the price selection switch and an output connection to one of the input connections of said second payback NAND gate.

14. Improvements to circuits to control the operations of vending machines that have coin receiving units capable of accepting coins of more than one denomination, said coin units having a plurality of coin switches corresponding respectively to the value of each acceptable coin denomination, accumulator means for accumulating the value of coins deposited in the coin unit during a vending operation, means for establishing a selected vend price for the vending machine, means to initiate a vend operation whenever an amount deposited at least equals the established vend price, means to refund amounts deposited during a vending operation in excess of the established vend price and means for resetting the accumulator means to a predetermined reset condition whenever an amount deposited at least equals the established vend price, the improvements comprising means associated with at least two of the coin switches in the coin unit to prevent the possibility that faulty coin switch operation will be able to make false entries into the accumulator means, said means including a pair of cross-coupled NAND gates associated with each of said two coin switches each having an operative connection to the associated coin switch, each of said NAND gates having input and output connections and producing an output response at its output connection whenever a coin actuates the associated coin switch, means connecting the output of one of said pair of cross-coupled NAND gates to an input to the other pair of cross-coupled NAND gates, other means to prevent the vending machine from jackpotting due to faulty operation of one of the coin switches, said anti-jackpot means including a circuit connection between one of the cross-coupled NAND gates associated with the coin switch and the refund means, a refund switch actuatable whenever an amount deposited in the coin unit exceeds the established vend price, and a pair of cross-coupled NAND gates operatively connected to the refund switch.

15. The improvements defined in claim 14 wherein one of said coin switches is a nickel switch, one is a dime switch, and one is a quarter switch, said nickel switch being actuated by the deposit of each nickel, dime and quarter in the coin unit, said dime switch being actuated by the deposit of each dime and each quarter, and the quarter switch being actuated by the deposit in the coin unit of each quarter only.

16. The improvements defined in claim 14 wherein the accumulator means includes a plurality of j–k flip-flop circuits each capable of being in one of two distinct operating states, said j–k flip-flops being constructed as parts of an integrated circuit.

17. The improvements defined in claim 14 wherein the means for establishing the vend price include a plurality of two position switches operatively connected to the accumulator means, the refund means and the coin switches, the combined settings of said two position switches establishing the vend price.

18. The improvements defined in claim 14 wherein said refund means include gate circuit means operatively connected to the accumulator means and the coin switches in the coin unit, said gate circuit means including means operable to select between refunding coins of two different denominations.

19. The improvements defined in claim 14 wherein at least one of the circuit NAND gates includes an expander input connection.

20. The improvements defined in claim 14 wherein at least one of the circuit NAND gates includes means connected thereto for delaying its operation.

21. The improvements defined in claim 14 including means associated with at least one of the circuit NAND gates to extend the operating time duration thereof.

* * * * *

UNITED STATES PATENT OFFICE

CERTIFICATE OF CORRECTION

PATENT NO. : Re. 28,749

DATED : March 30, 1976

INVENTOR(S) : James C. Douglass

It is certified that error appears in the above-identified patent and that said Letters Patent are hereby corrected as shown below:

Column 3, line 68, after "is" insert "in".

Column 9, line 14, "coin" should be "coil".

Column 10, line 56, after "cents" insert "vend".

Column 11, line 8, "section" should be "second"; line 22, "of" should be "to"; line 66, after "tor" insert "136".

Column 14, line 31, "turns" should be "turn"; line 51, after "first" insert "dime".

Column 18, line 30, after "connection" insert a comma (,).

Signed and Sealed this

*eighth* Day of *June 1976*

[SEAL]

*Attest:*

RUTH C. MASON
*Attesting Officer*

C. MARSHALL DANN
*Commissioner of Patents and Trademarks*